(12) United States Patent
Chandane

(10) Patent No.: US 7,475,387 B2
(45) Date of Patent: Jan. 6, 2009

(54) PROBLEM DETERMINATION USING SYSTEM RUN-TIME BEHAVIOR ANALYSIS

(75) Inventor: Sanjiv Chandane, Pune (IN)

(73) Assignee: International Business Machines Corporation, Armonk, NY (US)

( * ) Notice: Subject to any disclaimer, the term of this patent is extended or adjusted under 35 U.S.C. 154(b) by 730 days.

(21) Appl. No.: 11/029,782

(22) Filed: Jan. 4, 2005

(65) Prior Publication Data

US 2006/0150163 A1    Jul. 6, 2006

(51) Int. Cl.
   *G06F 9/44* (2006.01)
(52) U.S. Cl. ........................ 717/128; 717/126; 717/127; 717/131; 714/38
(58) Field of Classification Search ............... 714/37, 714/38; 717/124–135; 726/22–25
See application file for complete search history.

(56) References Cited

U.S. PATENT DOCUMENTS

| | | | | |
|---|---|---|---|---|
| 5,327,568 A | * | 7/1994 | Maejima et al. | 717/147 |
| 5,928,369 A | * | 7/1999 | Keyser et al. | 714/47 |
| 2002/0073063 A1 | | 6/2002 | Faraj | 707/1 |
| 2002/0184065 A1 | | 12/2002 | Menard et al. | 705/7 |
| 2003/0028825 A1 | | 2/2003 | Hines | 714/37 |
| 2003/0084071 A1 | * | 5/2003 | Iulo | 707/200 |
| 2003/0115581 A1 | | 6/2003 | Fahs et al. | 717/158 |
| 2003/0208511 A1 | | 11/2003 | Earl et al. | 707/204 |

OTHER PUBLICATIONS

S. D. Sharma et al., "Run-time and Comple-time Support for Adaptive Irregular Problems", Proceedings of the 1994 Conference on Supercomputing, 1994, pp. 97-106, Washington DC, USA.
S. Krishnan et al., "Automating parallel Runtime Optimizations Using Post-Mortem Analysis", Proceedings of the 10th ACM International Conference on Supercomputing, 1996, PPL Paper No. 96-08, Philadelphia, PA, USA.
INSPEC Accession No. 6276823, "Dynamic Currency Determination in Optimized Programs" D. M. Dhamdhere et al., ACM Transactions on Programing Languages and Systems, vol. 20, No. 6, pp. 1111-1130, Nov. 1998.
INSPEC Accession No. 5946436, "Formal Callability and its Relevance and Application to Interprocedural Data-Flow Analysis", J. Knoop Proceedings, 1998 International Conf. on Computer Languages, pp. 252-261, published Los Almitos,CA, USA, 1998.
M. Brodie et al., "Strategies for Problem Determination Using Probing", 2002, http://www.research.ibm.com/people/r/rish/papers/INFOCOMdraft.pdf.
M. Chen et al., "Pinpoint: Problem Determination in Large, Dynamic Systems", 2001, http://www.stanford.edu/~emrek/class/roc/draft-pinpoint.pdf.

* cited by examiner

*Primary Examiner*—Lewis A. Bullock, Jr.
*Assistant Examiner*—Jue Wang
(74) *Attorney, Agent, or Firm*—William Steinburg; Anthony V. S. England

(57) ABSTRACT

Run-time behavior is recorded using traces that are generated at run-time. A set of valid system behaviors is maintained. A recorded behavior can be added to the set of valid system behaviors if the run-time operation is completed successfully. Otherwise, the recorded behavior can be compared with members of the set of valid behaviors to determine differences. Such differences can be analysed to determine the cause of run-time errors.

3 Claims, 2 Drawing Sheets

US 7,475,387 B2

PROBLEM DETERMINATION USING SYSTEM RUN-TIME BEHAVIOR ANALYSIS

FIELD OF THE INVENTION

The present invention relates to problem determination using system run-time behavior analysis.

BACKGROUND

Problem determination involves detecting system problems and isolating the underlying causes of such system problems. Problem determination is identified as a core technology in the field of autonomic computing, and is considered an important yet difficult task.

Some existing problem determination techniques, such as log-and-trace preview approaches, analyze log files to generate events and make use of these events by searching a symptom database for possible remedies. Creating a symptom database is, however, a significant task and this approach has in many cases not been particularly successful.

Other techniques, such as those involving probing technology, make use of statistical data analysis for problem determination. Such techniques are complex in terms of the calculations involved.

Further techniques, such as the "pinpoint" technique, attempt to identify faulty components in a system. Such an approach can be helpful, but is not applicable if a system is not suitably modularized. Modularization can help to curb apparent system complexity to some extent. Regardless, detecting problems or failures and isolating their root causes is difficult whatever the level of system modularization.

Yet another technique is described in U.S. patent application No. 2002073063 filed Aug. 9, 2001 in the name of Faraj Mazen for International Business Machines Corporation, and published Jun. 13, 2002. This publication describes the generation of run-time traces for applications, in which problem determination is performed by generating and analyzing an application's trace data. A monitor is used for launching Java language virtual machines to generate event data. The event data is placed on an event queue, and the monitor then forwards the event data to a logging service. The logging service records the event data in a log file. A defined product description is used in conjunction with the log file data to provide an analysis to a user, based on a required level of analysis selected by the user. A graphical display of the data reflecting events from the product's run-time facilitates problem determination as the user is able to visually determine the execution path that the application followed.

Accordingly, in view of these and other observations, a need clearly exists for problem determination techniques that assist in analyzing the behavior of computer software applications.

SUMMARY

The run-time behavior of a system is referred to as the system "execution context". This execution context includes, for example, a function calling sequence (function stack), conditions that are evaluated to true or false, loops that are iterated, an iteration count, any "goto" statements that transfer the flow of control. At a lower level, the execution context can even include states of registers, and similar details. An execution context depends on a particular application, but may include such indicative details.

A "trace" is a message or statement that is recorded in a log file, and indicates the occurrence of a predetermined run-time event. A log file of traces indicates how the system behaves at run-time. This run-time behavior can thus be analyzed using the log file of traces that are generated at run-time. As computing systems generate a number of log files, such records can be used for problem determination. Each individual operation is monitored throughout its execution, to analyze the run-time behavior of the system during the execution of that operation.

The following protocol is used in the described approach to problem determination. First, all "correct" run-time behaviors of the system are recorded. These are behaviors that the system exhibits during the execution of a successful operation. Valid behaviors are listed in a set $R=\{R_1, R_2, \ldots R_n\}$. Second, the system and its run-time behavior are monitored as the system is executing an operation. The run-time behavior exhibited is referred to as $R_r$. Third, the exhibited run-time behavior $R_r$ is compared with those behaviors listed in set R.

Fourth, if the system is exhibiting a run-time behavior that does not match any of the known run-time behaviors first exhibited, then such a behavior can be treated as extraordinary. Such behavior may be a "problem" behavior, namely a behavior leading to a failure, also termed a problem situation.

Accordingly, if $R_r$ does not belong to set R, then $R_r$ is treated as a problem behavior and if $R_r$ belongs to set R, then $R_r$ is considered a correct behavior. Fifth, if the monitored operation does lead to a failure, then $R_r$ is treated as a problem behavior. To determine the causes of a failure, the problem behavior $R_r$ is compared with correct behaviors listed in set R. Sixth, the identified differences between the known behaviors (set R) and the problem behavior $R_r$, provide a basis for determining the causes of the particular problem.

The fourth step described above identifies the relevant problem, while the sixth step above identifies the underlying causes of the problem. Possible causes may be, for example, that a statement in the relevant code is incorrect, or that a condition is incorrect.

A symptom database is not used. Instead, log files containing traces are used to identify the run-time behavior of the system, and hence can be compared with recorded instances of actual system behavior to identify differences that indicate a cause of the problem behavior.

DETAILED DESCRIPTION

Consider a client-server application, in which a client sends a request to a server, and the server executes some operation to satisfy the client's request. As an example, a cluster of file servers store files, and clients request the file servers to STORE, RETREIVE or DELETE these files.

A file server, upon receiving a request from a client, executes corresponding operations to STORE, RETREIVE or DELETE the files, depending on the request. During the execution of an operation at the server, the run-time behavior is essentially the same for all successful executions of the same operation. As defined earlier, the run-time behavior is the function calling sequence, the conditions which are evaluated to true or false, loops that are executed, and so on.

A trace written in a log file records run-time behavior. The traces that are generated during the successful execution of an operation are essentially the same, across different executions. Such trace can be used for problem determination.

Figure 1:
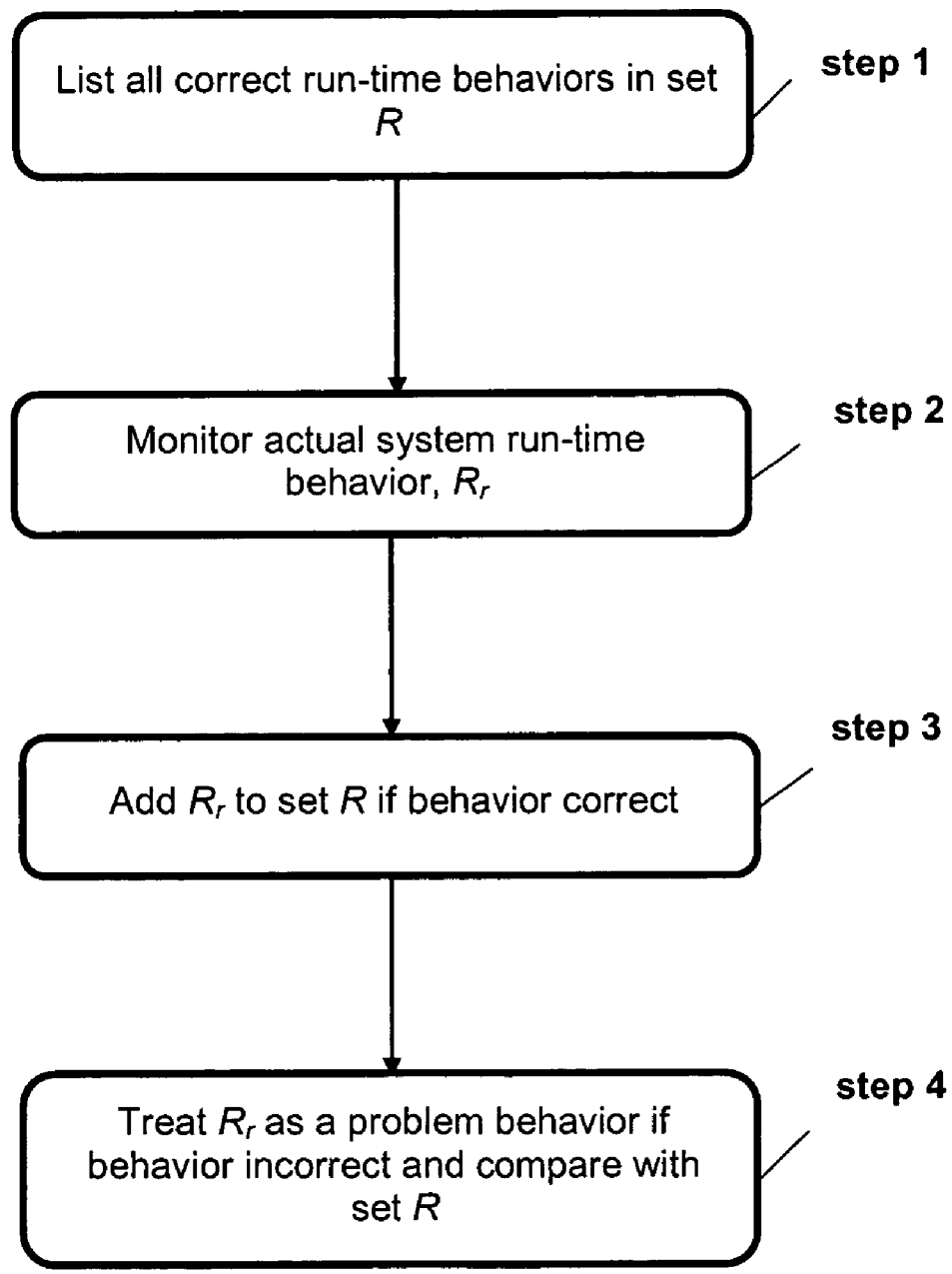
FIG. 1 is a flow chart of steps involved in a procedure for performing the problem determination techniques described herein.

FIG. 1 is a flow chart of steps involved in problem determination, which are described below.

Step 1 List all the traces that are recorded during the successful execution of an operation. There can be different traces generated during each execution of the same operation, and hence all such log files are stored. The traces form a set $R=\{R_1, R_2, R_3 \ldots R_n\}$, where each member identifies one complete successful execution of the operation.

Step 2 Start monitoring the system and the traces that are generated at run-time, during the execution of the same operation. This run-time trace is denoted $R_r$.

Step 3 Wait for the operation to complete. Check whether or not the operation is successful. If the operation is successful then check if $R_r$ belongs to set R. If so then output that the "operation is successful", else add $R_r$ to set R and then output that "operation is successful".

If the operation fails, as indicated by an error code, or by a function return value of 1 or −1. In this case, first output that "operation is failed" and then proceed to step 4 to determine the cause of the failure.

If the operation leads to an end condition in the code, such as an "abort" in the code that stops execution, then the operation does not actually come to an end and does not return any error code as such. In such a case, since the traces are closely monitored, as soon as a trace indicates that an end condition is reached in the code (such as if the trace contains an "abort" string), the system indicates that a failure is occurred, proceed $R_r$ to step 4 for finding the causes.

Step 4 Identify the differences between $R_r$ and each of $R_1, R_2, R_3 \ldots R_n$. The cause of such differences may be a bad function calling sequence a loop executing in an incorrect fashion.

A software entity that is being monitored typically incorporates functionality, referred to as a logger, that records traces in log files, which are stored on a storage medium. A further component, termed a differential analyzer, compares the traces of system behavior recorded in log files.

Different log files are generated for different operations, and further different log files are generated for different successful executions of an operation, provided that such successful operations are distinct. Table 1 below presents log files that may be generated following successive Store, Create and Delete operations.

TABLE 1

Store_1.log, Store_2.log
Create_1.log, Create_2.log, Create_3.log
Delete_1.log,

The traces for each successful operation that is executed are stored in particular log files for future reference. If an operation fails, which is indicated by an error code, or an assertion of memory fault, then the differential analyzer compares the log files generated during the failed execution with those already stored. This comparison assist in identifying the cause or causes of an error by indicating deviations from behavior deemed correct. This may be, for example, the name of a function that is executed, or a condition that is evaluated false, and so on.

Initially, the system captures and stores log files for each successful operation that is executed. Later when there are sufficient log files for comparisons, the system operates as an expert system with the differential analyzer comparing the logs generated by each operation and finding out the differences in the traces to determine causes of failure.

To help the system have a complete set R of traces for successful executions, one can use traces that are generated in a testing phase. Since testing involves traversing each line of code at least once, the traces can be collated for successful operations. Otherwise, the system can determine that a complete set R of traces is achieved. Each time the system generates a log file $R_r$ following a successful execution, if the trace $R_r$ repeatedly belongs to set R then the system is considered to have acquired a stable level of intelligence concerning valid system behaviors.

One can set policies for the logger, such as in case of assertion or abort, as soon as the logger receives a trace indicating an assertion or abort, pass on the trace to the differential analyzer indicating a failure. Other policies may also be set depending on the applications need.

Formats For the Traces

The logger records the traces in a format possible for the differential analyzer to determine the differences that identify a reason for failure.

Table 2 below presents a format that can be used to mark begin and end of a log file.

TABLE 2

| Log_begin: | <Operation-Name> Operation |
| Log_end: | <Operation-Name> Successful |
| Log_end: | <Operation-Name> failed with <error_code> |

Table 3 below presents a format for traces that record a function calling sequence during the execution of an operation.

TABLE 3

Function <Name-of-the-function> called
Function <Name-of-the-function> returned
Function <Name-of-the-function> failed with <error_code>

Table 4 below presents other formats that can be used to record a condition that is evaluated, loops that are iterated, and what memory operations are performed.

TABLE 4

Condition <condition-expression> is <true/false>
Loop < condition-expression > is iterated < X > number of times
Memory Operation: <statement ...<ptr-value> <ptr-value> ... >

The memory operation statement requires that whatever pointer values that are printed through it start with "0x". During the period in which a memory operation statement is recorded by the logger, the logger checks if any pointer value is NULL or not. If any of the pointer value turns out to be NULL, then the logger directly indicates to the differential analyzer that the memory operation is faulty and passes on the currently generated log file for the operation. The differential analyzer then shows in its output that the same memory operation is faulty. A statement such as "Abort: assertion" can be recorded just before an assertion.

During the time when this abort statement is recorded by the logger, the logger checks if the statement contains an "assertion" string or not. If the logger find an "assertion" string in the trace, the logger indicates to the differential analyzer that an assertion is reached in the code, and the execution is about to terminate. Further, the current log file for the operation is also passed to the differential analyzer. The differential analyzer further shows in its output that the assertion has occurred. Table 5 below presents pseudo-code for the logger.

TABLE 5

| | |
|---|---|
| Step 1 | Keep looping up inside a loop. |
| Step 2 | Receive a trace from the system being monitored. |
| Step 3 | If message is a "Log_begin" message, then this indicates that a new operation is started. Open a new file to store the log file for this particular operation. Write this "Log_begin" message into the log file and go to step 7. |
| Step 4 | If any policy set on the logger, such as received trace message contains an Abort or Assert, then write that message and close the log file. Give the log file to the differential analyzer and go to step 7. |
| Step 5 | If the operation is successful, as indicated in the "Log_end" message, and if the run-time behavior exhibited during the current execution is distinct from those already stored, then write this "Log_end" message into the log file and store the message onto the disk. Then, go to step 7. |
| Step 6 | If the operation fails, as indicated in the "Log_end" message, then write the message and close the log file. Pass the log file to the differential analyzer for root-cause analysis and go to step 7. |
| Step 7 | Continue in the loop with next iteration. |

Table 6 below presents pseudo-code for the differential analyzer.

TABLE 6

| | |
|---|---|
| Step 1 | Keep looping up inside a loop. |
| Step 2 | Receive a log file from the logger. |
| Step 3 | From the already stored log files for that particular operation, find out the log file which best matches with the log file just received from logger. |
| Step 4 | Determine the differences between the two log files, and output these differences. |
| Step 5 | Continue in the loop. |

Example Traces

Some example traces are now presented to assist a clear understanding of the problem determination techniques described herein. The traces are generated for an operation of creating a directory in the Andrew File System. The file server, upon receiving a request for creating a new directory from a client, executes an operation called SRXAFS_MakeDir( ) to create the directory. Table 7 below presents a trace obtained when this MakeDir operation is successful, and is thus a member of the Set R.

TABLE 7

| | |
|---|---|
| 1. | Log_Begin: <Make Dir> Operation |
| 2. | Function: <SRXAFS_MakeDir> called |
| 3. | Function: <SAFSS_MakeDir> called |
| 4. | Function: <GetVolumePackage> called |
| 5. | Function: <GetVolumePackage> Successful |
| 6. | Function: <Alloc_NewVnode> called |
| 7. | Function: <Alloc_NewVnode> successful |
| 8. | Function: <Update_ParentVnodeStatus> called |
| 9. | Function: <Update_ParentVnodeStatus> returned |
| 10. | Memory Operation: BCOPY(parentptr=0x303b68a8,newACL=0x303b6a38,192) |
| 11. | Function: <Update_TargetVnodeStatus> called |
| 12. | Function: <Update_TargetVnodeStatus> returned |

TABLE 7-continued

| | |
|---|---|
| 13. | Function: <BreakCallBack> called |
| 14. | Function: <BreakCallBack> returned |
| 15. | Function: <SetCallBackStruct> called |
| 16. | Function: <SetCallBackStruct> returned |
| 17. | Function: <PutVolumePackage> called |
| 18. | Function: <VPutVnode> called |
| 19. | Function: <VPutVnode_r> called |
| 20. | Function: <VPutVnode_r> returned |
| 21. | Function: <VPutVnode> returned |
| 22. | Function: <VPutVnode> called |
| 23. | Function: <VPutVnode_r> called |
| 24. | Function: <VPutVnode_r> returned |
| 25. | Function: <VPutVnode> returned |
| 26. | Function: <PutVolumePackage> returned |
| 27. | Function: <SAFSS_MakeDir> successful |
| 28. | Log_End: <Make Dir> successful |

First Case—Assertion During the Execution of the Make Dir Operation

An assertion occurs during the execution of a Make Dir operation.

Step 1 Set R, with a trace for successful execution of MakeDir operation, is available in Table 7 above.

Step 2 The MakeDir operation is monitored and the traces logged. Table 8 below presents the traces that are generated.

TABLE 8

1. Mon Aug 25 15:00:00 2003 Log_Begin: <Make Dir> Operation
2. Mon Aug 25 15:00:00 2003 Function: <SRXAFS_MakeDir> called
3. Mon Aug 25 15:00:00 2003 Function: <SAFSS_MakeDir> called
4. Mon Aug 25 15:00:00 2003 Function: <GetVolumePackage> called
5. Mon Aug 25 15:00:00 2003 Function: <GetVolumePackage> Successful
6. Mon Aug 25 15:00:00 2003 Function: <Alloc_NewVnode> called
7. Mon Aug 25 15:00:00 2003 Function: <Alloc_NewVnode> successful
8. Mon Aug 25 15:00:00 2003 Function: <Update_ParentVnodeStatus> called
9. Mon Aug 25 15:00:00 2003 Function: <Update_ParentVnodeStatus> returned
10. Mon Aug 25 15:00:00 2003 Memory Operation: BCOPY(parentptr=0x303b68a8,newACL=0x303b6b60,192)
11. Mon Aug 25 15:00:00 2003 Function: <Update_TargetVnodeStatus> called
12. Mon Aug 25 15:00:00 2003 Function: <Update_TargetVnodeStatus> returned
13. Mon Aug 25 15:00:00 2003 Function: <BreakCallBack> called
14. Mon Aug 25 15:00:00 2003 Function: <BreakCallBack> returned
15. Mon Aug 25 15:00:00 2003 Function: <SetCallBackStruct> called
16. Mon Aug 25 15:00:00 2003 Function: <SetCallBackStruct> returned
17. Mon Aug 25 15:00:00 2003 Function: <PutVolumePackage> called
18. Mon Aug 25 15:00:00 2003 Function: <VPutVnode> called
19. Mon Aug 25 15:00:00 2003 Function: <VPutVnode_r> called
20. Mon Aug 25 15:00:00 2003 Condition: <vnp->nUsers != 0> FALSE
21. Mon Aug 25 15:00:00 2003 Abort: assertion Step 3 As soon as an end condition is reached in the code, that is, an assertion indicated by the trace at line 21, failure is indicated. The log file $R_r$ is passed to the differential analyzer to determine the causes of the failure.

Step 4 The differential analyzer compares $R_r$ with that of the member of set R. After line number 20 the trace $R_r$ generated does not match with that of the member of set R.

Table 9 below presents the differences in the traces.

TABLE 9

| | |
|---|---|
| 20. | Condition: <vnp->nUsers != 0> FALSE |
| 21. | Abort: assertion |

These differences indicate that cause of the failure, which is that vnp->nUsers is determined to be zero. This conditions causes an assert, and the file server stops accordingly.

Second case—make Dir operation fails with an error

An error occurs during the execution of a MakeDir operation.

Step 1 Set T as above with a trace of the successful execution of MakeDir operation.

Step 2 The MakeDir operation is monitored and the traces are recorded. Table 10 below presents the traces that are recorded.

TABLE 10

1. Mon Aug 25 15:30:24 2003 Log_Begin: <Make Dir> Operation
2. Mon Aug 25 15:30:24 2003 Function: <SRXAFS_MakeDir> called
3. Mon Aug 25 15:30:24 2003 Function: <SAFSS_MakeDir> called
4. Mon Aug 25 15:30:24 2003 Function: <GetVolumePackage> called
5. Mon Aug 25 15:30:24 2003 Function: <GetVolumePackage> Successful
6. Mon Aug 25 15:30:24 2003 Function: <Alloc_NewVnode> called
7. Mon Aug 25 15:30:24 2003 Condition: <errorCode = AdjustDiskUsage( )> TRUE
8. Mon Aug 25 15:30:24 2003 Function: <Alloc_NewVnode> failed with ENOSPC
9. Mon Aug 25 15:30:24 2003 Condition: <errorCode = Alloc_NewVnode( )> TRUE
10. Mon Aug 25 15:30:24 2003 Function: <PutVolumePackage> called
11. Mon Aug 25 15:30:24 2003 Function: <VPutVnode> called
12. Mon Aug 25 15:30:24 2003 Function: <VPutVnode_r> called
13. Mon Aug 25 15:30:24 2003 Function: <VPutVnode_r> returned
14. Mon Aug 25 15:30:24 2003 Function: <VPutVnode> returned
15. Mon Aug 25 15:30:24 2003 Function: <PutVolumePackage> returned
16. Mon Aug 25 15:30:24 2003 Function: <SAFSS_MakeDir> failed with ENOSPC
17. Mon Aug 25 15:30:24 2003 Log_End: <Make Dir> failed with ENOSPC Step 3 The "Log_End" trace indicates the end of the operation. The return value of the operation is checked, and in this case the operation fails. The log file is presented to the differential analyzer to determine the causes of the failure.

Step 4 The differential analyzer compares $R_r$ with the member of set R, which determines that the traces do not match. The difference in the form of the lines which are not matching are indicated by line numbers 7, 8 and 9 in Table 11 below.

TABLE 11

7. Mon Aug 25 15:30:24 2003 Condition: <errorCode = AdjustDiskUsage( )> TRUE
8. Mon Aug 25 15:30:24 2003 Function: <Alloc_NewVnode> failed with ENOSPC
9. Mon Aug 25 15:30:24 2003 Condition: <errorCode = Alloc_NewVnode( )> TRUE The cause is AdjustDiskUsage( ) returned an error of ENOSPC, which is passed to Alloc_NewVnode( ) which is also seen to be failing because there is no space in the file system to create the directory.

Third Case—Memory Operation Failure Causing a Memory Fault

The second case described above appears to be simple, since the error code indicates the cause of the failure. A third case presents a memory fault that occurs during the execution of MakeDir operation.

Step 1 Set R is the same as in the second case with a trace of the successful execution of MakeDir operation.

Step 2 The MakeDir operation is monitored and the traces are logged. Table 12 below presents the traces that are generated in this case.

TABLE 12

1. Mon Aug 25 11:35:01 2003 Log_Begin: <Make Dir> Operation
2. Mon Aug 25 11:35:01 2003 Function: <SRXAFS_MakeDir> called
3. Mon Aug 25 11:35:01 2003 Function: <SAFSS_MakeDir> called
4. Mon Aug 25 11:35:01 2003 Function: <GetVolumePackage> called
5. Mon Aug 25 11:35:01 2003 Function: <GetVolumePackage> Successful
6. Mon Aug 25 11:35:01 2003 Function: <Alloc_NewVnode> called
7. Mon Aug 25 11:35:01 2003 Function: <Alloc_NewVnode> successful
8. Mon Aug 25 11:35:01 2003 Function: <Update_ParentVnodeStatus> called
9. Mon Aug 25 11:35:01 2003 Function: <Update_ParentVnodeStatus> returned
10. Mon Aug 25 11:35:01 2003 Memory Operation: BCOPY(parentptr=0x303b6658,newACL=0x0,192)

Step 3 Wait until the system operation completes. But, as soon as the trace for line no. 10 is received (a memory operation), a check is first made of whether the pointer values produce a NULL verification. In this case, the newACL pointer is NULL. Accordingly, the operation fails and corresponding output passes the log file to the differential analyzer.

Step 4 The differential analyzer compares the traces, and finds that the execution stopped after line no. 10. Also, differential analyzer determines that the newACL pointer is NULL. The pointer values do not match since these values are different for different executions.

Computer Hardware

Figure 2:
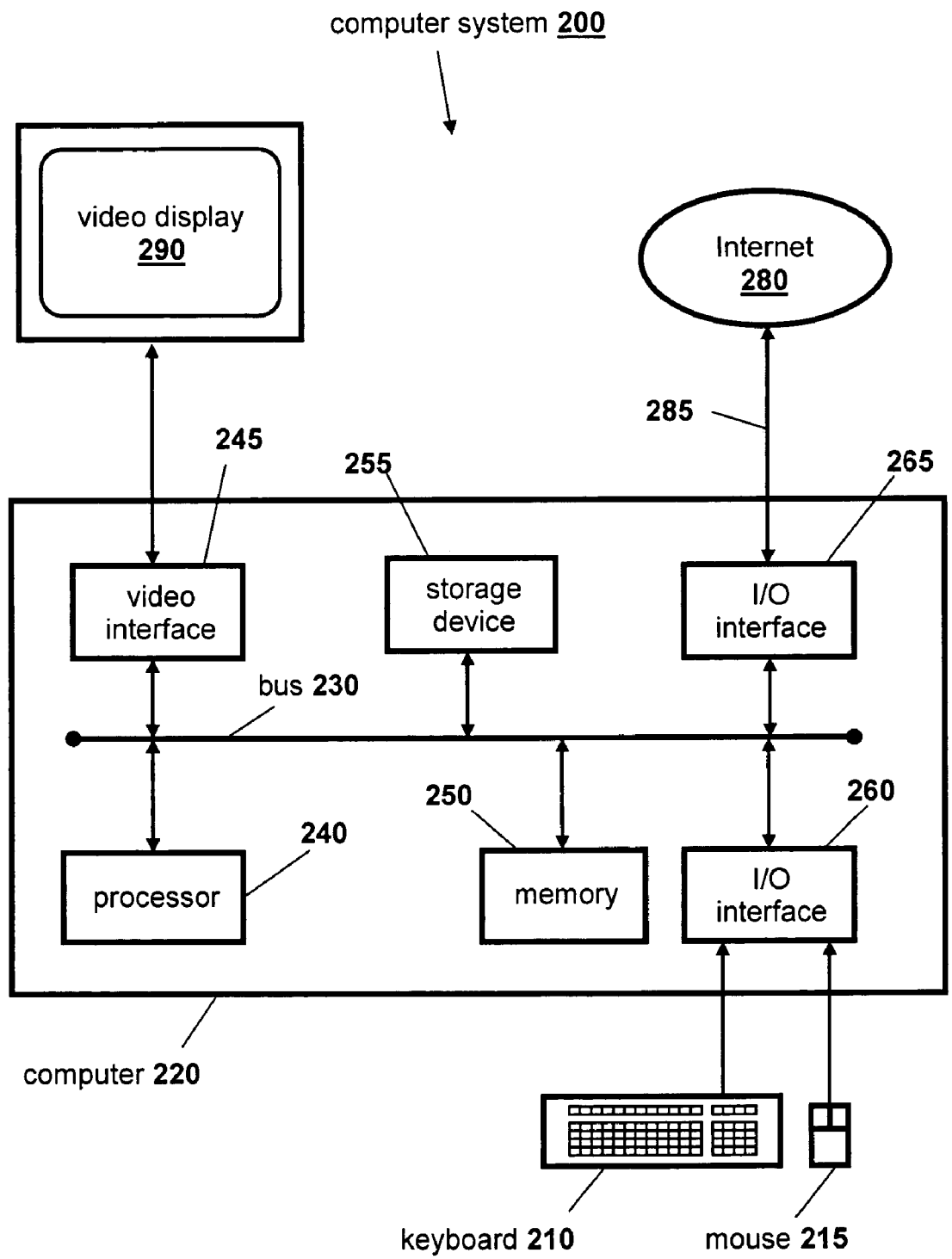
FIG. 2 is a schematic representation of a computer system of a type suitable for performing the described problem determination techniques.

FIG. 2 is a schematic representation of a computer system 200 of a type that is suitable for executing computer software for the described problem determination techniques. Computer software executes under a suitable operating system installed on the computer system 200, and may be thought of as comprising various software code means for achieving particular steps.

The components of the computer system 200 include a computer 220, a keyboard 210 and mouse 215, and a video display 290. The computer 220 includes a processor 240, a memory 250, input/output (I/O) interfaces 260, 265, a video interface 245, and a storage device 255.

The processor 240 is a central processing unit (CPU) that executes the operating system and the computer software executing under the operating system. The memory 250 includes random access memory (RAM) and read-only memory (ROM), and is used under direction of the processor 240.

The video interface 245 is connected to video display 290 and provides video signals for display on the video display 290. User input to operate the computer 220 is provided from the keyboard 210 and mouse 215. The storage device 255 can include a disk drive or any other suitable storage medium.

Each of the components of the computer 220 is connected to an internal bus 230 that includes data, address, and control buses, to allow components of the computer 220 to communicate with each other via the bus 230.

The computer system 200 can be connected to one or more other similar computers via a input/output (I/O) interface 265 using a communication channel 285 to a network, represented as the Internet 280.

The computer software may be recorded on a portable storage medium, in which case, the computer software program is accessed by the computer system 200 from the storage device 255. Alternatively, the computer software can be accessed directly from the Internet 280 by the computer 220. In either case, a user can interact with the computer system 200 using the keyboard 210 and mouse 215 to operate the programmed computer software executing on the computer 220.

Other configurations or types of computer systems can be equally well used to execute computer software that assists in implementing the techniques described herein.

CONCLUSION

The effectiveness of the described technique depends on the size and contents of set R, which is the set of all the traces for successful execution of an operation. Typically, software systems make use of "log-levels" to record traces for problem determination. A high "log-level" provides detailed system information compared to a low "log-level".

Analysing compact log files for particular operations is more readily achieved, compared with analysing the level of detail used in log files, and can be varied depending on what details the developer wishes to record. Like, if the developer wants to record only the function calling sequence, then the log level can be set as 1. If the developer wants to know only the conditions that are evaluated, then the log level can be set to "2", for loops level can be set as "3" and so on. The traces generated to optimize set R are thus suitably detailed, as specified.

Various alterations and modifications can be made to the techniques and arrangements described herein, as would be apparent to one skilled in the relevant art.

What is claimed is:

1. A method for analysing computer system behavior comprising the steps of:
   a) detecting first actual computer system behaviors occurring during first run time executions in the computer system of operations including store operations, retrieve operations, create operations, delete operations and make directory operations;
   b) storing, respective records of valid traces relating to the computer system execution responsive to detecting that ones of the respective first run times resulted in respective valid system executions, wherein the records are stored in respective sets corresponding to valid system executions of the respective store, retrieve, create, delete and make directory operations;
   c) recording, during a second run time execution for the computer system, second actual computer system behavior as a record of traces of the computer system execution, the first and second behaviors being selected from among behaviors including:
      i) sequences of functions called during run times,
      ii) conditions evaluated as true during run times,
      iii) conditions evaluated as false during run times,
      iv) loops encountered and numbers of iterations of the encountered loops during run times, and
      v) goto statements encountered that affect execution flow during run times;
   d) detecting a failure for the second run time execution, wherein the second run time execution is an execution of a type of operation selected from a group including a store operation, a retrieve operation and a delete operation;
   e) responsive to the failure detection in d), comparing, by the computer system, the trace record of the second behavior to a selected one of the sets of the trace records of the first behaviors, wherein the selected set is for the same type of operation as the operation of the second run time execution;
   f) selecting one of the first behavior trace records responsive to the comparing in e), wherein the selected first behavior trace record has, in comparison to the trace record of the second behavior, fewer differences than any of the other trace records of the selected first behavior trace record set; and
   g) determining and presenting one or more differences between the selected one of the first behavior trace records and the trace record of the second behavior, wherein the one more differences between the selected one of the first behavior trace records and the trace record of the second behavior indicate a cause of the detected failure.

2. A computer system comprising:
   a processor; and
   a storage device connected to the processor, wherein the storage device has stored thereon a system behavior analysis program for controlling the processor, and wherein the processor is operative with the program to execute the program for performing the steps of:
   a) detecting first actual computer system behaviors occurring during first run time executions in the computer system of operations including store operations, retrieve operations, create operations, delete operations and make directory operations;
   b) storing, respective records of valid traces relating to the computer system execution responsive to detecting that ones of the respective first run times resulted in respective valid system executions, wherein the records are stored in respective sets corresponding to valid system executions of the respective store, retrieve, create, delete and make directory operations;
   c) recording, during a second run time execution for the computer system, second actual computer system behavior as a record of traces of the computer system execution, the first and second behaviors being selected from among behaviors including:
      i) sequences of functions called during run times,
      ii) conditions evaluated as true during run times,
      iii) conditions evaluated as false during run times,
      iv) loops encountered and numbers of iterations of the encountered loops during run times, and
      v) goto statements encountered that affect execution flow during run times;
   d) detecting a failure for the second run time execution, wherein the second run time execution is an execution of a type of operation selected from a group including a store operation, a retrieve operation and a delete operation;
   e) responsive to the failure detection in d), comparing, by the computer system, the trace record of the second behavior to a selected one of the sets of the trace records of the first behaviors, wherein the selected set is for the same type of operation as the operation of the second run time execution;

f) selecting one of the first behavior trace records responsive to the comparing in e), wherein the selected first behavior trace record has, in comparison to the trace record of the second behavior, fewer differences than any of the other trace records of the selected first behavior trace record set; and g) determining and presenting one or more differences between the selected one of the first behavior trace records and the trace record of the second behavior, wherein the one more differences between the selected one of the first behavior trace records and the trace record of the second behavior indicate a cause of the detected failure.

3. A computer program product recorded on a storage device for analyzing system behavior, the computer program product having instructions for execution by a computer, wherein the instructions, when executed by the computer, cause the computer to implement a method comprising the steps of:

a) detecting first actual computer system behaviors occurring during first run time executions in the computer system of operations including store operations, retrieve operations, create operations, delete operations and make directory operations;

b) storing, respective records of valid traces relating to the computer system execution responsive to detecting that ones of the respective first run times resulted in respective valid system executions, wherein the records are stored in respective sets corresponding to valid system executions of the respective store, retrieve, create, delete and make directory operations;

c) recording, during a second run time execution for the computer system, second actual computer system behavior as a record of traces of the computer system execution, the first and second behaviors being selected from among behaviors including:
  i) sequences of functions called during run times,
  ii) conditions evaluated as true during run times,
  iii) conditions evaluated as false during run times,
  iv) loops encountered and numbers of iterations of the encountered loops during run times, and
  v) goto statements encountered that affect execution flow during run times;

d) detecting a failure for the second run time execution, wherein the second run time execution is an execution of a type of operation selected from a group including a store operation, a retrieve operation and a delete operation;

e) responsive to the failure detection in d), comparing, by the computer system, the trace record of the second behavior to a selected one of the sets of the trace records of the first behaviors, wherein the selected set is for the same type of operation as the operation of the second run time execution;

f) selecting one of the first behavior trace records responsive to the comparing in e), wherein the selected first behavior trace record has, in comparison to the trace record of the second behavior, fewer differences than any of the other trace records of the selected first behavior trace record set; and g) determining and presenting one or more differences between the selected one of the first behavior trace records and the trace record of the second behavior, wherein the one more differences between the selected one of the first behavior trace records and the trace record of the second behavior indicate a cause of the detected failure.

* * * * *